United States Patent
Kwiecinski et al.

(10) Patent No.: US 7,804,425 B2
(45) Date of Patent: Sep. 28, 2010

(54) PARKING ASSIST SYSTEM

(75) Inventors: Robert Kwiecinski, Saline, MI (US);
Thomas Michael McQuade, Ann Arbor, MI (US); Brian Gordon Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 12/123,512

(22) Filed: May 20, 2008

(65) Prior Publication Data
US 2009/0289813 A1  Nov. 26, 2009

(51) Int. Cl.
*B60Q 1/48* (2006.01)
*G08G 1/14* (2006.01)

(52) U.S. Cl. .................. 340/932.2; 340/933; 340/988; 701/70

(58) Field of Classification Search .............. 340/932.2, 340/933, 988, 995.1, 438, 937, 903, 990; 701/41, 70, 36, 300, 121, 213, 207; 180/168, 180/170
See application file for complete search history.

(56) References Cited

U.S. PATENT DOCUMENTS

| | | | |
|---|---|---|---|
| 5,610,815 A | 3/1997 | Gudat et al. | |
| 6,185,501 B1 | 2/2001 | Smith et al. | |
| 6,498,983 B2 | 12/2002 | Hashida | |
| 6,564,123 B2 | 5/2003 | Hahn et al. | |
| 6,574,550 B2 | 6/2003 | Hashida | |
| 6,591,172 B2 | 7/2003 | Oda et al. | |
| 6,640,188 B2 | 10/2003 | Hashida | |
| 6,687,610 B2 | 2/2004 | Hashida | |
| 6,847,892 B2 | 1/2005 | Zhou et al. | |
| 6,856,895 B2 | 2/2005 | Hashida et al. | |
| 6,919,822 B2* | 7/2005 | Tanaka et al. | 340/932.2 |
| 6,925,370 B2* | 8/2005 | Smith et al. | 701/36 |
| 7,069,128 B2* | 6/2006 | Iwama | 701/36 |
| 7,239,958 B2* | 7/2007 | Grougan et al. | 701/200 |
| 2004/0039525 A1 | 2/2004 | Draeger et al. | |
| 2004/0260433 A1 | 12/2004 | Sawada et al. | |
| 2006/0069478 A1 | 3/2006 | Iwama | |
| 2008/0033603 A1 | 2/2008 | Gensler et al. | |
| 2009/0091475 A1* | 4/2009 | Watanabe et al. | 340/932.2 |

* cited by examiner

*Primary Examiner*—Toan N Pham

(57) ABSTRACT

A vehicle parking assist system for assisting a driver of the vehicle in parking such vehicle in a garage located at a preselected global position. The system includes: a global positioning system mounted to the vehicle having stored therein the global position of the garage, for determining actual global position of the vehicle and providing a signal indicating when the vehicle is proximate the location of the garage; a range sensor for detecting a wall of the garage in front of a direction of motion of the vehicle into the garage; and a processor, responsive to the global positioning system provided by the global positioning system indicating when the vehicle is proximate the garage; the range sensor, for indicating when the vehicle has parked in the garage such that front of the vehicle is forward of the wall while enabling a door of the garage to be closed without striking the vehicle.

8 Claims, 3 Drawing Sheets

PARKING ASSIST SYSTEM

TECHNICAL FIELD

This invention relates generally to parking assist systems and more particularly to systems for assisting a driver of the vehicle in parking such vehicle in a garage.

BACKGROUND

As is known in the art, systems are available to assist a driver of a vehicle in detecting objects in front of a vehicle. These objects may be other vehicles moving on a highway. Here, such systems advise the driver when approaching within several feet of a forward vehicle.

As is also known in the art, many simple devices have been used to assist the driver in ensuring such driver has parked the vehicle sufficiently and safely into the garage such that the front of the vehicle does not strike the wall in front of the vehicle while enabling the overhead door of the garage to be closed without striking the rear of the vehicle. Such systems require notification when the vehicle is only several inches in front of a wall of the garage. Thus, the distance-measuring requirement is different for a highway application than for a parking application.

One such system includes hanging a tennis ball, for example, from the ceiling of the garage at a point such that when the ball hits a predetermined point on the windshield of the vehicle the driver is advised that the vehicle is sufficiently away from a wall in front of the vehicle and also sufficiently within the garage such that the overhead door may be safely closed without hitting the rear of the vehicle. Unfortunately, the hanging ball occupies space in the garage and may otherwise interfere with activity within the garage in the absence of the parked vehicle.

SUMMARY

In accordance with the present invention, a vehicle parking assist system is provided for assisting a driver of the vehicle in parking such vehicle in a garage located at a preselected global position. The system includes: a global positioning system mounted to the vehicle having stored therein the global position of the garage, for determining actual global position of the vehicle and providing a signal indicating when the vehicle is proximate the location of the garage; a range sensor for detecting a wall of the garage in a front of a forward moving portion of the vehicle into the garage; and a processor, responsive to the global positioning system provided by the global positioning system indicating when the vehicle is proximate the garage, and the range sensor for indicating when the vehicle has parked into the garage such that the forward moving portion of the vehicle is spaced a predetermined distance from the wall while enabling a door of the garage to be closed without striking the vehicle.

Thus, a system is provided to advise and assist an automotive driver while driving into his primary or home garage, which is determined by a Global Positioning System (GPS) to realize the direct or straight-line distance from the outer most forward or rearward extremity distance from his driven vehicle, such as a front or rear bumper, to a garage wall or other surface of concern that he is approaching. This method is particularly applicable to garages where there is limited space fore and aft of the vehicle.

In accordance with another feature of the invention, a method is provided for assisting a driver of the vehicle in parking such vehicle in a garage. The method includes: determining actual position of the vehicle; providing a signal indicating when the vehicle is proximate the location of the garage; activating a range detection system disposed on the vehicle in response to the provided indicating signal; and producing a warning to an operator of the vehicle in response to the activated range detection signal when the activated range detection system indicates the vehicle is at a predetermined range from an garage object.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
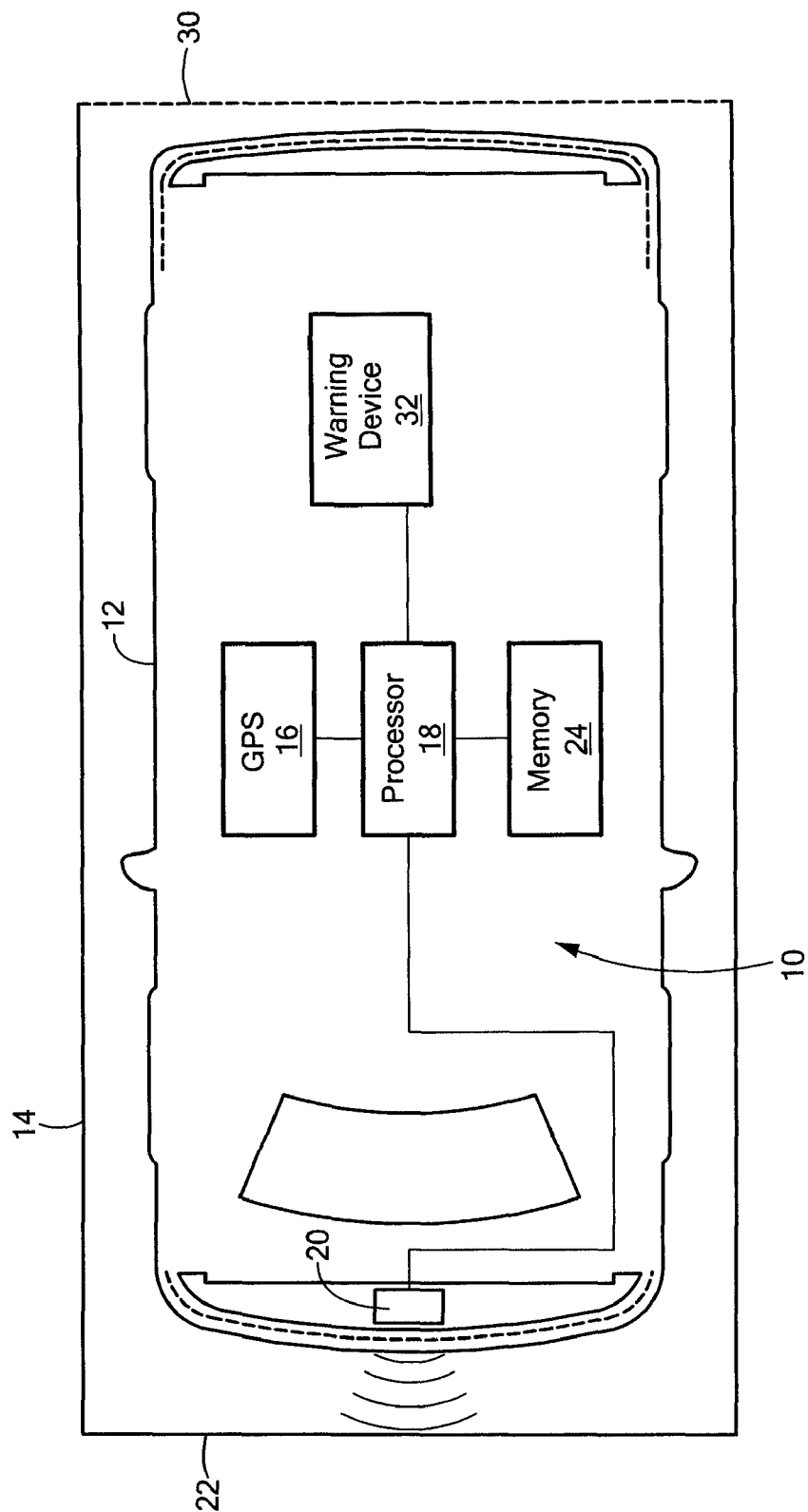
FIG. 1 is a sketch of a vehicle parked in a garage, such vehicle having a vehicle parking assist system for assisting a driver of the vehicle in parking such vehicle in the garage in accordance with the invention.

Referring now to FIG. 1, a vehicle parking assist 10 for assisting a driver of the vehicle 12 in parking such vehicle 12 in a garage 14 located at a preselected global position as shown. The system 10 includes a global positioning system (GPS) 16 mounted to the vehicle 12, for determining actual global position of the vehicle 2 and providing a signal indicating to a processor 18 when the vehicle 12 is proximate the location of the garage 14.

The system 10 includes a range sensor or detector 29 mounted either to the front of the vehicle 12, as shown, or to the rear of the vehicle 12, or to both the front and rear of the vehicle 12, for detecting a wall 22 of the garage 14 in a front of a forward moving portion of the vehicle 12 as such vehicle 12 enters the garage 12 (i.e., in front of either the front of the vehicle or, in the case or a vehicle backing into the garage, the rear of the vehicle).

The processor 18 is mounted in the vehicle 12 (and may be the engine control unit), responsive to the global positioning system 16 when the vehicle is proximate the garage 14, and the range sensor 20 (for example, an ultrasound sensor, an infrared sensor, an optical sensor, radar or other similar type range sensor) for indicating when the vehicle has parked into the garage such that the forward moving portion of the vehicle is spaced a predetermined distance from the wall 22 while enabling a door 30 of the garage to be closed without striking the vehicle 12.

Figure 3:
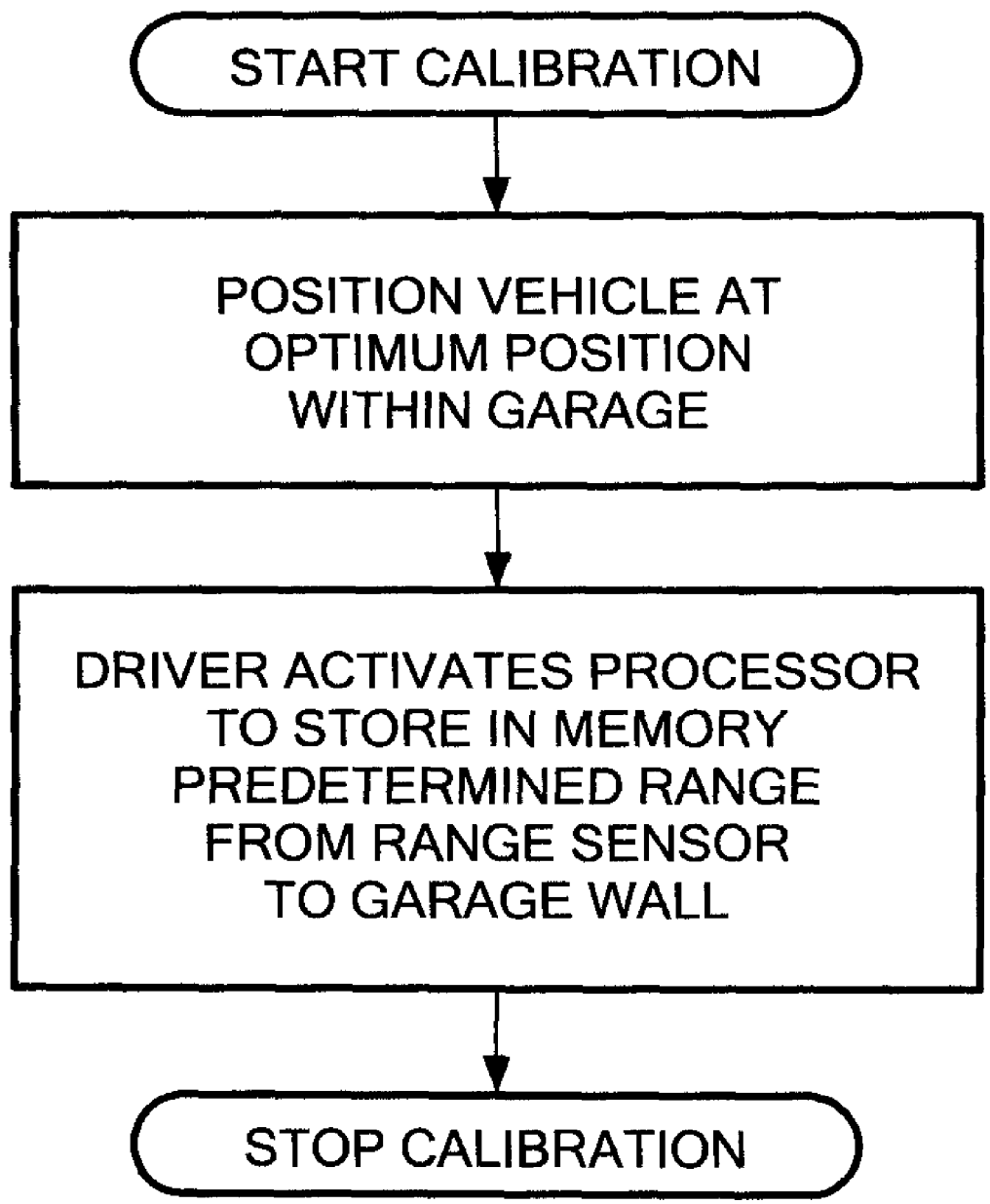
FIG. 3 is a flowchart of a calibration process used in FIG. 2.

The predetermined distance is determined during a calibration phase, referring to FIG. 3, initially the driver positions the vehicle at an optimum position within the garage. Next, the driver activates the processor 18 by pressing a suitably mounted button, not shown, so that the processor store this position as a reference position, i.e., corresponding to the predetermined distance from the wall 22, in the memory 24.

Thus, the system and method advise and assist an automotive driver while driving into his primary or home garage, in which his vehicle 12 location is determined by the Global Positioning System (GPS) 16. An onboard vehicle distance measuring system, here range sensor 20, is then used to measure the direct or straight-line distance from the outer most forward or rearward extremity distance from his driven vehicle 12, such as a front or rear bumper, to the garage wall 22 or other obstacle surface of concern that the driver is approaching. The driver will then be advised by a warning device 32 of one or more combinations of the following: 1) Audible warning similar or the same as a front park aid warning. The beeping repetition rate will increase as the front of the vehicle approaches the wall. When the front bumper has approached within a predetermined distance, stored in memory 24 typically been a few inches and about 2 feet and then a solid warning tone will be enacted. 2) A LCD display indicating numerical distance to the wall 22 and with display located in one of the following: a) Message Center; b) Rear or side view mirror; c) Navigation or radio display 3) A dedicated vehicle LCD display indicating red/yellow/green relative to distance to wall. 4) A gentle or pulsed braking reminder that a predetermined distance has been reached to the wall. A Learn mode may be incorporated to reference the initial distance setting so the vehicle warning system would alert the driver at the same distance to the wall. In a system defeat mode, the processor 18 allows the driver to deselect the Garage Wall Distance mode if desired.

Figure 2:
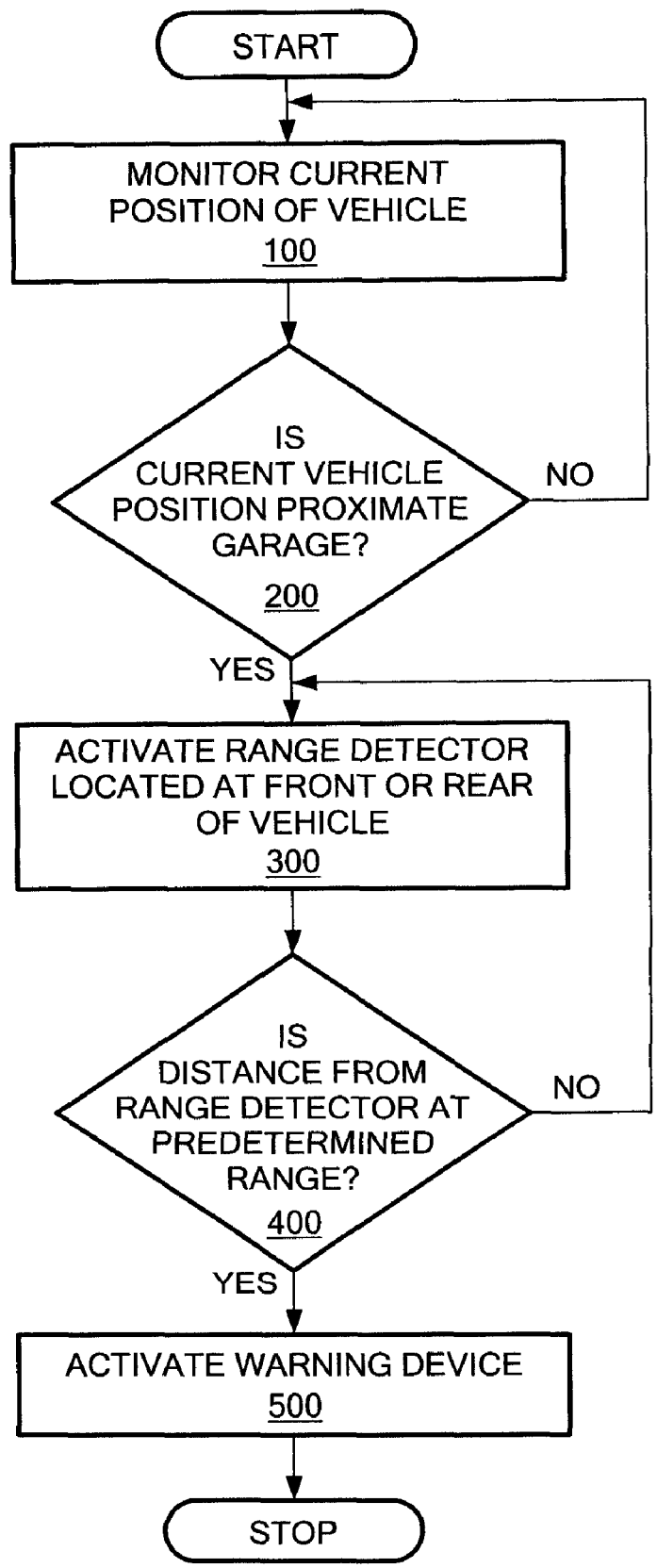
FIG. 2 is a flowchart of the process used by the vehicle of FIG. 1 to assisting a driver of the vehicle in parking such vehicle in the garage in accordance with the invention.

The processor 18 is programmed, such program being stored as computer code a memory 24, as represented by the flowchart in FIG. 2. Thus, the GPS 16 monitors the current global position of the vehicle 12, Step 100. The location of the garage 14 into which the vehicle is parked is stored in the memory 24 used by the processor 18. Thus, the processor 18 compares the actual location of the vehicle, as provided by the GPS 16, with the position of the garage stored in memory 24, Step 200. When processor 18 detects that the position of the vehicle 12 is proximate to the location of the garage 14, the range detector 20 is activate by a signal transmitted by the processor 18 to the range detector 20, Step 300. In another embodiment, the signal from the range detector 20 is continuously fed to the processor but the processor does not use the range detector signal 20 (again the range detection system is not activated (i.e., used by the processor 18) until the GPS 16 detects that the position of the vehicle 12 is proximate to the location of the garage 14. The activated range detector 20 detects range from the vehicle to any object in front of the forward moving vehicle, Step 400. Thus, here when a predetermined range stored in the memory 24 used by the processor 18 is reached; the warning device 32 in the vehicle 12 is activated, Step 500. Thus, the warning signal is produced only when both the vehicle is proximate the garage and the distance from the senor to the object, here the wall, is less than a predetermined distance.

Thus, a system is provided to advise and assist an automotive driver while driving into his primary or home garage, which is determined by a Global Positioning System (GPS) to realize the direct or straight-line distance from the outer most forward or rearward extremity distance from his driven vehicle, such as a front or rear bumper, to a garage wall or other surface of concern that he is approaching. This method is particularly applicable to garages where there is limited space fore and aft of the vehicle.

The warning device may be one or a combination of the following:

1. Audible warning similar or the same as a front park aid warning. The beeping repetition rate will increase as the front of the vehicle approaches the wall. When the front bumper has approached within a predetermined distance then a solid warning tone will be enacted.

2. A LCD display indicating numerical distance to the wall and with display located in one of the following:

a. Message Center
   b. Rear or side view mirror
   c. Navigation system display 3. A LCD display indicating red/yellow/green relative to distance to wall.

4. Another option would be a gentle or pulsed brake reminder that a predetermined distance has been reached to the wall.

5. Learn mode for the initial distance setting so that it could alert the driver at the same distance every time.

6. The driver may deselect the Garage Wall Distance mode if desired.

A number of embodiments of the invention have been described. Nevertheless, it will be understood that various modifications may be made without departing from the spirit and scope of the invention. For example, while a GPS system has been described for providing the current position of the vehicle, other positioning systems may be used such as is used by locating the location of a cell phone where the vehicle has a cell phone built into it or where the cell phone is linked to the car such as with Bluetooth. Accordingly, other embodiments are within the scope of the following claims.

What is claimed is:

1. A vehicle parking assist system for assisting a driver of a vehicle in parking such vehicle in a garage having a location at a preselected global position, comprising:

a positioning system mounted to the vehicle having stored therein the global position of the garage, for determining actual global position of the vehicle and providing a signal indicating when the vehicle is proximate the location of the garage;

a range sensor for detecting a wall of the garage in a front of a forward moving portion of the vehicle into the garage; and a processor, responsive to a global position provided by the positioning system indicating when the vehicle is proximate the garage, and the range sensor for indicating when the vehicle has properly parked the vehicle into the garage.

2. The system recited in claim 1 wherein the positioning system in a global positioning system.

3. A vehicle parking assist system for assisting a driver of a vehicle in parking such vehicle in a garage having a location at a preselected global position, comprising:

a positioning system mounted to the vehicle having stored therein the global position of the garage, for determining actual global position of the vehicle and providing a signal indicating when the vehicle is proximate the location of the garage;

a range sensor for detecting a wall of the garage in a front of a forward moving portion of the vehicle into the garage; and a processor, responsive to the positioning system provided by a global positioning system indicating when the vehicle is proximate the garage, and the range sensor for indicating when the vehicle has parked into the garage such that the forward moving portion of the vehicle is spaced a predetermined distance from the wall while enabling a door of the garage to be closed behind the vehicle without striking the vehicle.

4. The system recited in claim 3 wherein the positioning system is a global positioning system.

5. A method for assisting a driver of a vehicle in parking such vehicle in a garage, comprising:

determining position of the vehicle;

providing a signal indicating when the vehicle is proximate the garage;

activating a range detection system disposed on the vehicle in response to the provided indicating signal;

producing a warning to an operator of the vehicle in response to the activated range detection signal when the activated range detection system indicates the vehicle is at a predetermined range from a garage object.

6. The method recited in claim 5 including an initial calibration mode for determining a proper position of the vehicle within the garage, and wherein the warning is produced when the vehicle is at the proper position from the object.

7. A method for assisting a driver of a vehicle in properly parking the vehicle in a parking space, comprising:

determining position of the vehicle;

providing a signal indicating when the vehicle is proximate the parking space;

activating a range detection system disposed on the vehicle in response to the provided indicating signal;

producing a warning to an operator of the vehicle in response to the activated range detection signal when the activated range detection system indicates the vehicle is at a proper position in the parking space.

8. The method recited in claim 5 including an initial calibration mode for determining the proper position of the vehicle, and wherein the warning is produced when the vehicle is at the proper position.

* * * * *